UNITED STATES PATENT OFFICE.

ALEXANDER COCHARD, OF PORT RICHMOND, NEW YORK.

IMPROVED BEVERAGE.

Specification forming part of Letters Patent No. 46,081, dated January 31, 1865.

*To all whom it may concern:*

Be it known that I, ALEXANDER COCHARD, of Port Richmond, in the county of Richmond and State of New York, have invented and made an Improved Beverage; and I do hereby declare the following to be a full, clear, and exact description of the mode of compounding and preparing such beverage.

I make use of the ingredients hereinafter named in about the proportion specified, and proceed as follows to produce my improved beverage: I take fourteen pounds of sugar, two quarts of vinegar, two pounds of raisins, (Corinth raisins preferred,) five ounces of coriander-seeds, five ounces of hops. I also prefer to add one ounce of rock-candy, two ounces of orange-peel, one-third of an ounce of citric acid, and a weak infusion of peppermint. These substances are to be placed in a barrel and sufficient water added to make, when the operation is complete, one hundred bottles of the beverage—say, about thirty gallons. These ingredients are to be thoroughly stirred several times a day for four or five days. The liquid is then to be strained, for which I prefer a felt bag containing charcoal, and the liquid is to be received into a barrel or other suitable vessel, and is to be clarified, for which I prefer and use the whites of four eggs, and allowed to remain for two days, when it is to be decanted into bottles, and can be kept any desired length of time, and when opened will froth like champagne, and is a pleasant and refreshing beverage.

What I claim, and desire to secure by Letters Patent, is—

The beverage prepared of the ingredients and in the manner specified.

In witness whereof I have hereunto set my signature this 8th day of December, 1864.

AL. COCHARD.

Witnesses:
LEMUEL W. SERRELL,
CHAS. H. SMITH.